April 14, 1942.  A. J. MERICKLE  2,279,633
VARIABLE PITCH PROPELLER
Filed Oct. 9, 1939    2 Sheets-Sheet 1
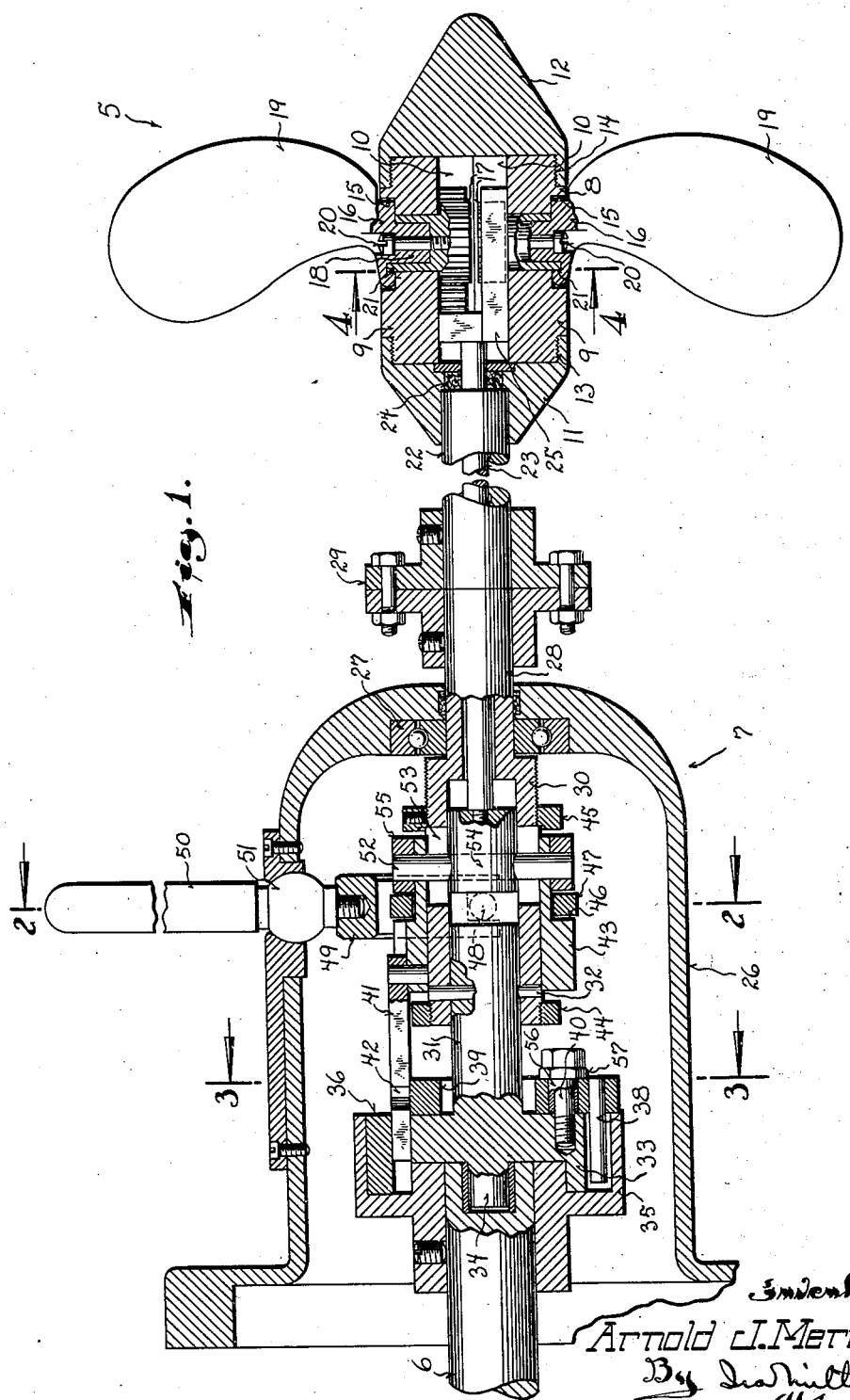
Inventor
Arnold J. Merickle April 14, 1942. A. J. MERICKLE 2,279,633
VARIABLE PITCH PROPELLER
Filed Oct. 9, 1939 2 Sheets-Sheet 2
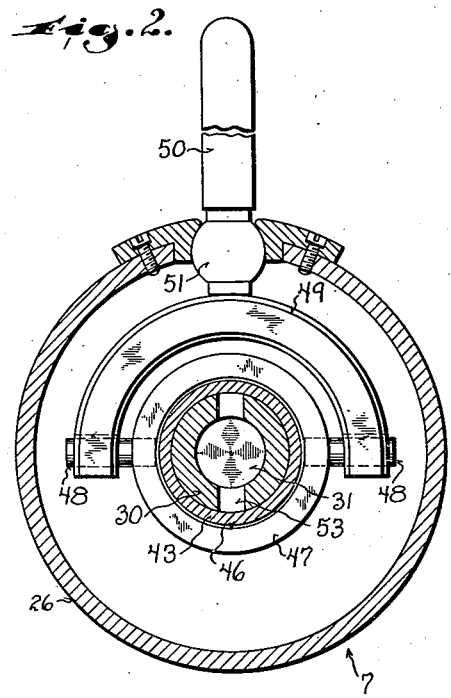
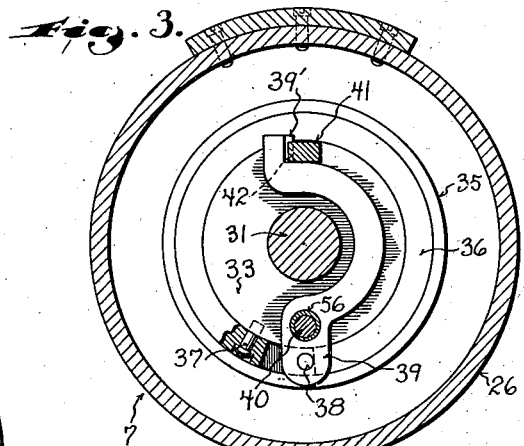
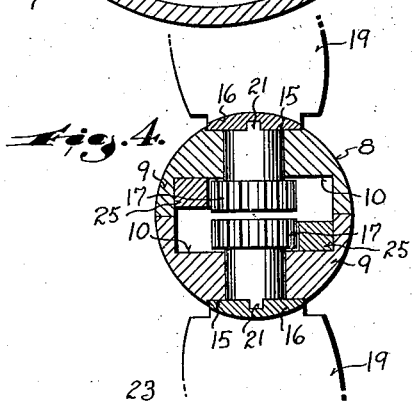
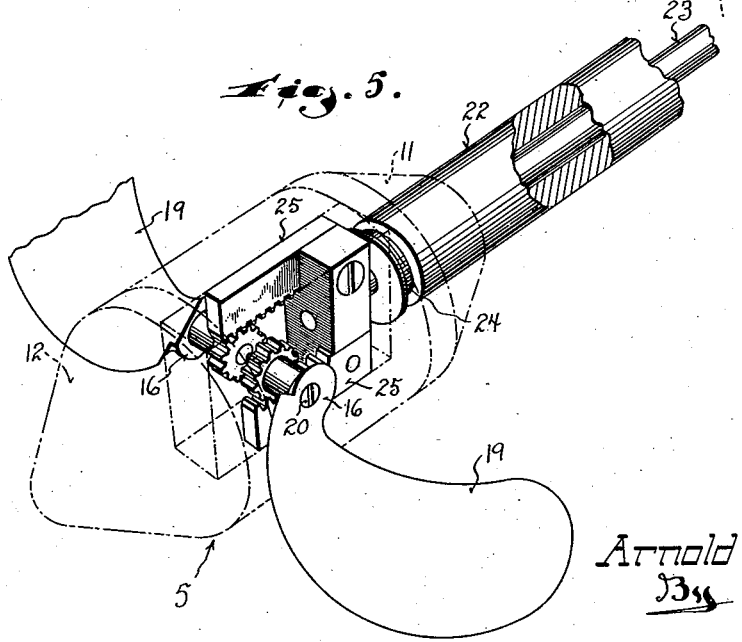
Inventor
Arnold J. Merickle Patented Apr. 14, 1942

2,279,633

UNITED STATES PATENT OFFICE 2,279,633

VARIABLE PITCH PROPELLER

Arnold J. Merickle, West Allis, Wis., assignor of one-third to Henning J. Sellberg and one-third to Ralph L. Switzer, Milwaukee, Wis.

Application October 9, 1939, Serial No. 298,597

1 Claim. (Cl. 170—163)

This invention relates to variable pitch propellers, and refers particularly to marine propellers.

Variable pitch propellers, and in fact, reversible pitch propellers, are not broadly new; but heretofore these propellers have been quite complicated in construction and oftentimes impractical.

It is, therefore, an object of this invention to provide a variable or reversible pitch propeller of simple design and so constructed as to be practical for use in motor boats.

One of the objections to many of the variable pitch propellers heretofore proposed, was the presence of some part of the pitch adjusting mechanism on the exterior of the unit.

The present invention avoids this objection by having the entire pitch adjusting mechanism inside the hub and drive shaft of the propeller.

Another object of this invention is to provide a propeller of the character described, wherein the blades are readily removable to permit replacement.

In the interest of simplicity of control, the present invention also has, as one of its objects, the provision of a drive transmission so designed that a single control lever provides for the adjustment of the propeller pitch and also for its connection with the power source.

More specifically, it is an object of this invention to provide a power transmission having a clutch for connecting the propeller drive shaft with the power source and having mechanism whereby the clutch may be engaged concomitantly with the actuation of the pitch adjusting mechanism in one direction or the other.

With the above and other objects in view, which will appear as the description proceeds, this invention resides in the novel construction, combination and arrangement of parts substantially as hereinafter described and more particularly defined by the appended claim, it being understood that such changes in the precise embodiment of the hereindisclosed invention may be made as come within the scope of the claim.

The accompanying drawings illustrate one complete example of the physical embodiment of the invention constructed in accordance with the best mode so far devised for the practical application of the principles thereof, and in which:

Figure 1 is a longitudinal sectional view through a propeller and its drive transmission constructed in accordance with this invention;

Figure 2 is a cross sectional view taken through Figure 1 on the plane of the line 2—2;

Figure 3 is a detail sectional view taken through Figure 1 on the plane of the line 3—3;

Figure 4 is a cross sectional view taken through Figure 1 on the plane of the line 4—4; and Figure 5 is a perspective view of the pitch adjusting mechanism of the propeller.

Referring now particularly to the accompanying drawings, in which like numerals indicate like parts, the numeral 5 designates generally a variable or reversible pitch propeller constructed in accordance with this invention and adapted to be drivingly connected to a power driven shaft 6 through a transmission, indicated generally by the numeral 7.

The propeller comprises a cylindrical hub 8 consisting of two complementary semicylindrical sections 9 joined on a median plane. The inner meeting portions of the two sections have registering straight-walled recesses 10 which together form a substantially rectangular cavity inside the hub. The hub is of the sectional construction described to enable assembly, as will appear from the description to follow.

End caps 11 and 12 having internally threaded skirts threaded onto reduced end portions 13 and 14 of the hub, serve to hold the hub sections together and close the ends of the cavity therein. These caps are preferably of substantially conical shape and their outer surfaces are flush with the cylindrical surface of the hub.

Each hub section has a radial bore 15 through its wall opening to the inner cavity and the exterior of the hub. Journalled in these bores are propeller stems 16. The propeller stems carry gears 17 on their inner ends which are located inside the cavity of the hub and have their outer end portions, which terminate short of the cylindrical outer wall of the hub, bored to receive extensions 18 on the inner ends of propeller blades 19.

Screws 20 passing through holes in the inner end portions of the propellers and threaded into the propeller stems, detachably secure the blades to their stems; and lugs 21 on the stems, engaging in appropriate recesses in the propeller, secure the stems against rotation with respect to their blades.

It is to permit the assembly of the propeller stems with the hub that the hub is formed in two complementary sections; for otherwise the diameter of the hub would have to be quite enlarged, as will be readily apparent.

A hollow drive shaft 22 has one end secured in the cap 11 to drive the propeller. Slidable in this shaft is a shifting rod 23, the outer end of which projects through a packing 24 into the cavity inside the propeller hub, where it is attached to two connected racks 25. One rack meshes with one of the gears 17, and the other meshes with the other gear 17 the racks being disposed at opposite sides of the gears so that simultaneous endwise movement thereof turns the gears, and consequently the propeller blades, in opposite directions.

The transmission 7 by which the propeller is drivingly connected with the power driven shaft 6 comprises a supporting housing 26 which may be secured to the engine (not shown) and which mounts a bearing 27 in which a hollow stub shaft 28 is journalled. The shaft 28 is coupled to the hollow propeller drive shaft, as at 29, and is coaxial with the power driven shaft 6.

Inside the housing 26 the shaft 28 is enlarged to provide a sleeve 30, in the end of which a clutch shaft 31 is secured by a taper pin 32, or the like. This clutch shaft carries a disc 33 and has a pilot 34 entering a pilot bearing in the adjacent end of the power driven shaft 6.

A cup-shaped female clutch member 35 is fixed to the adjacent end of the power shaft and receives the disc 33 therein. Encircling the disc inside the clutch member 35 is an expansive ring 36. One end of this ring is anchored, as at 37, to the disc 33 and the other end thereof bears against a pin 38 carried by a lever 39 which overlies the face of the disc 33 and is arched to extend around the shaft 31.

Adjacent to its pin 38, the lever 39 is pivoted on a post 40 carried by the disc so that motion of the opposite end of the lever to the left, as viewed in Figure 3, expands the ring 36 into frictional engagement with the inner surface of the female clutch part thereby establishing a driving connection from the power driven shaft to the shaft 31, and consequently the propeller drive shaft.

Such motion is imparted to the free end of the lever 39 by a bar 41 slidably mounted in an appropriate recess in the disc 33 and provided with a notch 42 in which the adjacent V-shaped end 39' of the lever is received when the clutch is disengaged. Sliding the bar 41 in one direction or the other engages the clutch.

The bar 41 is connected to a shifter collar 43 encircling the sleeve 30. This collar is slidable between limits defined by stop rings 44 and 45 threaded on the opposite ends of the sleeve.

An annular groove 46 in the outer surface of the collar receives a spanner ring 47 which carries diametrically opposite pins 48 engaged by a shifter fork 49. The shifter fork is carried by a manually operable control lever 50 pivotally mounted, as at 51, on the housing 26.

It is thus possible to slide the collar 43 in one direction or the other by means of the control lever 50, to shift the bar 41 in either direction and cam the lever end 39' out of the notch 42 for engaging the clutch.

Sliding motion of the collar 43, in addition to engaging the clutch, also varies the pitch of the propeller. For this purpose, the inner end of the shifting rod 23 is connected to the collar through a cross pin 52 secured in the collar and extending through elongated openings 53 in the wall of the sleeve to connect with a head 54 fixed to the adjacent end of the shifting rod.

To enable assembly of the parts, the annular groove 46, in which the spanner ring 47 is received, has one side thereof formed by a separate ring 55 fitted over a reduced end of the collar 43 and secured in place by the pin 52.

It is to be observed that the axial motion of the parts connected with the control lever, for varying the pitch of the propeller and for engaging and disengaging the clutch, is effected without interfering with rotation of the parts.

Proper clutch action is assured even though the walls of the notch in the bar 41 and the adjacent lever end 39' may wear, through the provision of an eccentric bushing 56 on the post 40. This bushing has a hexagonal head 57 enabling adjustment thereof upon loosening the post in the disc 33. Such adjustment carries the actual pivot axis for the lever 39 toward or from the free end of the expansion ring, as will be readily apparent.

From the foregoing description taken in connection with the accompanying drawings, it will be readily apparent that this invention provides a simple practical construction for variable and reversible pitch propellers and that through the provision of common means for effecting engagement and disengagement of the driving clutch and adjusting the pitch of the propeller, simplicity and convenience in control are assured.

What I claim as my invention is:

In a variable pitch propeller, the combination of: a hollow drive shaft; a hub fixed to one end of the drive shaft and having a cavity opening to the interior of the drive shaft; blades carried by the hub; mechanism inside the hub for varying the pitch of the blades; a shift rod of less diameter than the inside diameter of the hollow drive shaft, said shift rod being movable endwise inside the hollow drive shaft and connected with the pitch varying mechanism inside the hub; a transmission into which the other end of the hollow drive shaft and the shift rod extend and through which the drive shaft is connectible with a source of power, including manual shift mechanism connected with the shift rod for moving the same back and forth axially of the hollow drive shaft to vary the pitch of the propeller blades, a power shaft coaxial with said hollow drive shaft, and cooperating clutch parts connected with said shafts and rendered operative to drivingly connect the shafts upon actuation of said shift mechanism to move the shift rod in either direction; and a housing for the transmission having its interior communicating with the interior of the hollow drive shaft so that a lubricant contained in the housing may flow through the hollow shaft in the space between it and the shift rod and into the cavity of the hub to lubricate the pitch varying mechanism therein and protect the same against corrosion.

ARNOLD J. MERICKLE.